July 28, 1964     H. B. RICE ETAL     3,142,371
SPOTTING DEVICE FOR BOTTLES AND THE LIKE
Filed Feb. 19, 1960     3 Sheets-Sheet 3
FIG_6
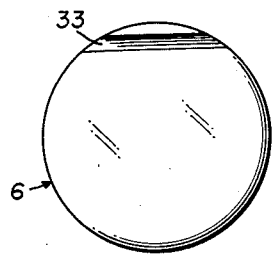
FIG_7
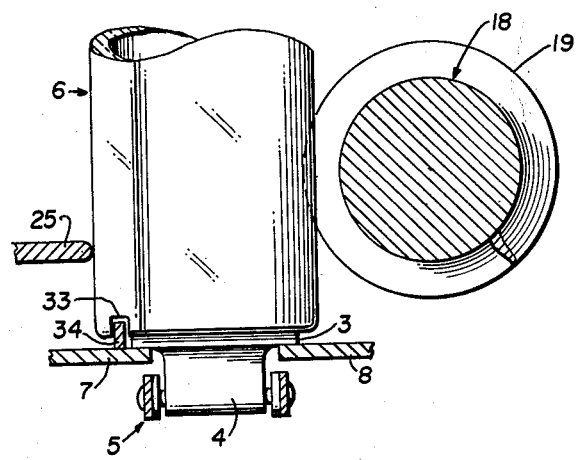
FIG_8
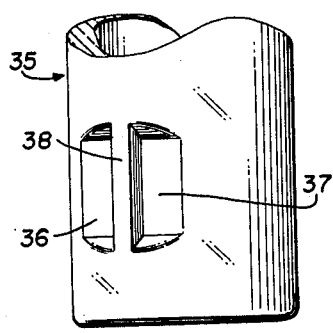
FIG_9
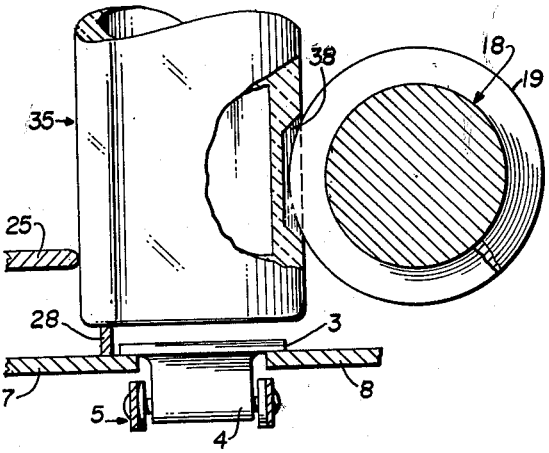
INVENTORS
HAROLD B. RICE;
CLOTIEL AGUILAR
ADMINISTRATRIX OF THE
ESTATE OF JOHN AGUILAR
BY Bayken, Mohler + Wood
ATTORNEYS United States Patent Office 3,142,371
Patented July 28, 1964

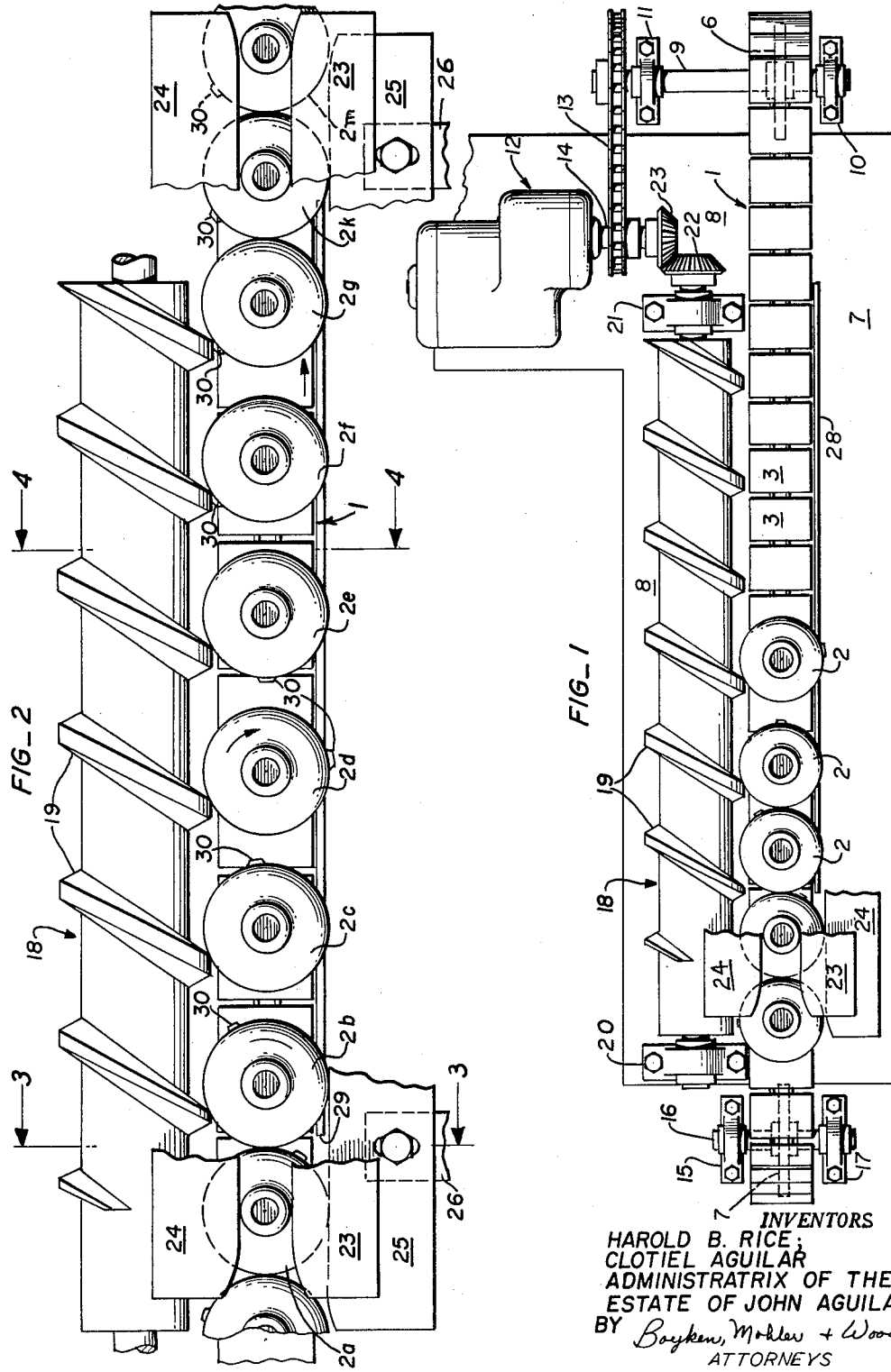

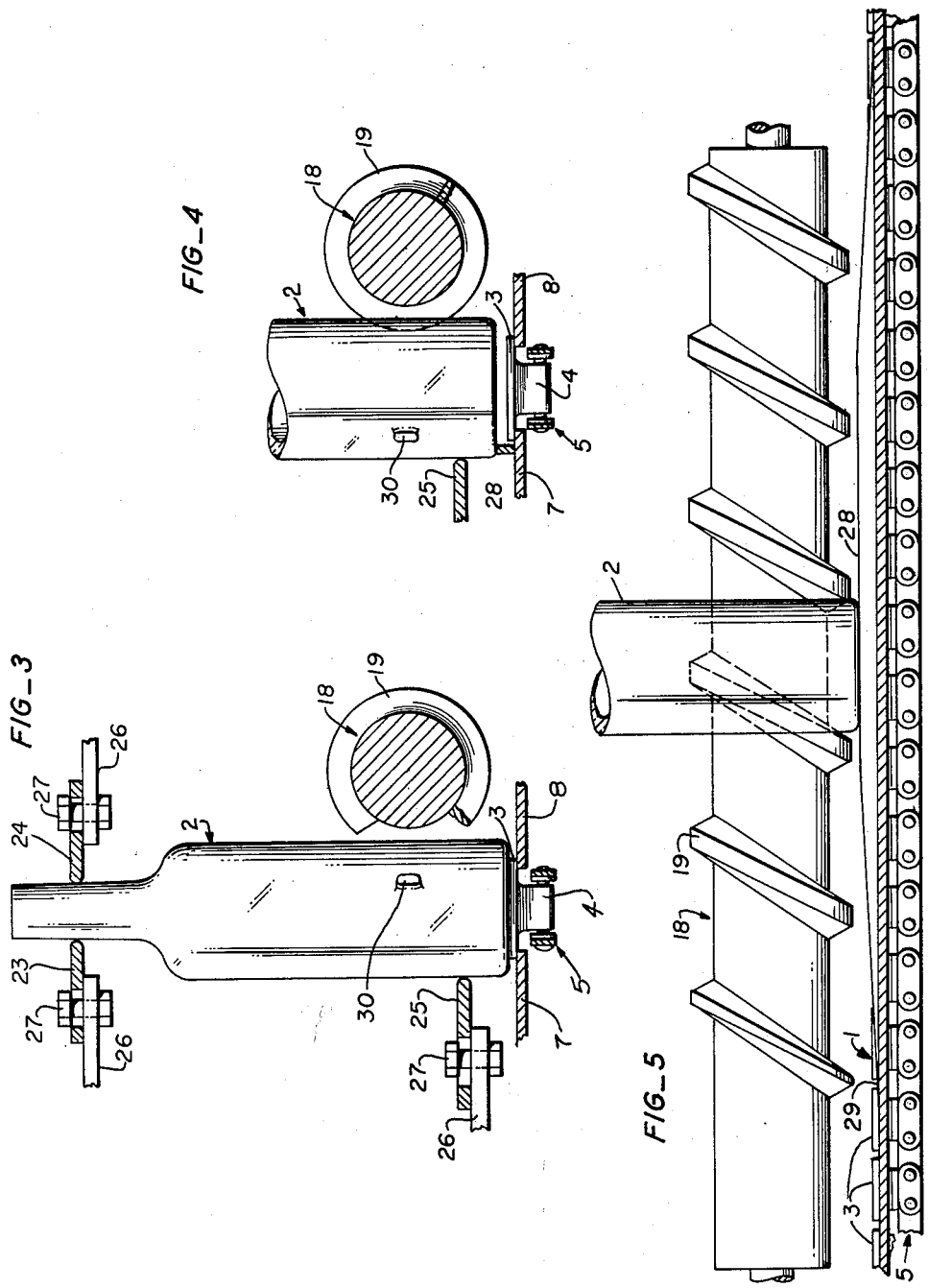

3,142,371
SPOTTING DEVICE FOR BOTTLES AND THE LIKE
Harold B. Rice, Walnut Creek, Calif., and John G. Aguilar, deceased, late of Contra Costa County, Calif., by Clotiel Aguilar, administratrix, Contra Costa County, Calif., assignors to John Burton Machine Corporation, Concord, Calif.
Filed Feb. 19, 1960, Ser. No. 9,734
7 Claims. (Cl. 198—33)

This invention relates to an apparatus and method for arranging cylindrical articles such as bottles in a predetermined angular relationship.

In the bottling industry it becomes important to arrange the bottles, usually after they are filled, in a predetermined angular relationship relative to their path of travel so that, for example, the labels that are placed on the large body portion of the bottles are directly under the label, if any, that is applied to the bottle neck. This require arranging the bottles in a predetermined angular relationship relative to the path of travel on which they are moved through the labelling apparatus.

Heretofore various kinds of apparatus have been evolved to achieve this desirable object. Examples are shown in U.S. Patent No. 2,706,031, dated April 12, 1955, U.S. Patent No. 2,468,290, dated April 26, 1949, and U.S. Patent No. 2,843,252, dated July 15, 1958.

Regardless of the method followed to "spot" the bottles such bottle spotters rely on the bottle structure being specially formed at a point on its periphery or bottom so that such special formation cooperates with a stop element while the bottle is rotating to stop the bottle at a predetermined angular position relative to the path of travel of the bottle.

The present invention lends itself to use with bottles which are formed with conventional spotting elements used in the past. However, as will be seen, the method and apparatus used by the present invention are considerably more simple than the methods and apparatus heretofore employed and of equal effectiveness.

It is therefore the main object of this invention to provide a novel method for spotting bottles and the like which lends itself to use through apparatus which is considerably more simple than that previously available.

A further object of the invention is to provide an improved apparatus for spotting bottles and which apparatus lends itself to use with the various types of spotting elements now in use.

Other objects and advantages will be apparent from the following specifications and the drawings.

FIG. 1 is a top plan view of a portion of a conveying line for bottles and the like incorporating the apparatus of the invention.

FIG. 2 is an enlarged plan view of the feed screw and conveyor of FIG. 1 showing schematically the manner in which the feed screw rotates the bottles about their longitudinal axes.

FIG. 3 is a vertical cross section through the approach end of the apparatus of FIG. 2 as taken along lines 3—3 of FIG. 2.

FIG. 4 is a vertical cross section through the apparatus of FIG. 2 as taken along lines 4—4 of FIG. 2.

FIG. 5 is a side elevation of the mechanism of FIG. 2 showing the means for raising the bottles above the conveyor.

FIG. 6 is a bottom plan view of a bottle having a spotting slot formed in its bottom.

FIG. 7 is a view similar to FIG. 4 showing the manner in which the invention spots a bottle having a downwardly opening slot formed therein.

FIG. 8 is a fragmentary perspective of a bottle of the type having a recessed shoulder in its periphery.

FIG. 9 is a vertical cross section through the apparatus employed with the bottle shown in FIG. 8.

In detail the apparatus of the present invention is adapted to be employed with a conventional bottle conveyor which carries the bottles to a labelling machine (not shown) for example. It will be understood that the invention lends itself to use with other conventional cylindrical articles, for example cans, but it will be described in detail with reference to bottles.

A conventional horizontally extending conveyor generally designated 1 may be employed for carrying bottles 2 along a predetermined path of travel in one direction. The type of conveyor shown in the drawings is one that includes a plurality of rectangular support plates 3, each of which is pivotally secured by a support 4 (FIG. 3) to a link joint of a chain generally designated 5. At one end of the conveyor 1 the chain 5 passes around a driven sprocket wheel 6 and at the opposite end it passes around an idler sprocket 7. Intermediate its opposite ends the upper run of conveyor 1 is supported in longitudinally extending support plates 7, 8 which are spaced apart transversely of conveyor 1 and slidably engage the under sides of plates 3 adjacent the opposite ends of the latter.

Driven sprocket 6 is supported on a shaft 9 which in turn is rotatable in bearings 10, 11. Shaft 9 may be driven through a sprocket chain 13 from the output shaft 14 of a motor reducer such as indicated at 12 (FIG. 1). Idler sprocket 7 may be supported on a suitable shaft 16 rotatable in bearings 15, 17 (FIG. 1).

Alongside and above conveyor 1 is a feed screw generally designated 18 provided with a helix 19 which is sufficiently large to accommodate a bottle within each flight thereof (FIG. 2). As best seen in FIG. 1 feed screw 18 is rotatably supported at its opposite ends in bearings 20, 21 and may be driven through bevel gears 22, 23 from shaft 14 of motor reducer 12.

It will be understood that the speed of rotation of shaft 14, the size of gears 22, 23 and the sprockets of sprocket chain 13 may be proportioned so that the forward speed of conveyor 1 may be made slightly greater than the advancing speed of helix 19.

As best seen in FIG. 3 the bottles 2 are held in a predetermined path of travel parallel to conveyor 1 by means of a pair of flat bars 23, 24 positioned on opposite sides of the neck of the bottles 2 and a third flat bar 25 positioned to engage the side of each bottle opposite the feed screw 18. Said flat bar guides may be adjustably secured to suitable frame members 26 and adjustably fastened by means of bolts 27 in the desired position relative to feed screw 18.

The speed of conveyor 1 is preferably such that it tends to feed bottles 2 in the direction indicated in FIG. 2 at a speed greater than that at which helix 19 allows the bottles to move in said direction. The result is, as shown in FIG. 2, that bottles entering the device from the left pile up so that bottles are always in place waiting to be advanced by the helix 19.

Extending substantially along the entire length of the feed screw 18 is a flat bar 28, the left end 29 of which is relatively shallow (FIG. 5). The depth of flat bar 28 gradually increases to the horizontal central portion thereof and then gradually diminishes again as best seen in FIG. 5. The function of flat bar 28 is to lift the bottles 2 off the conveyor 1 so that any forward movement of the bottles comes about only by the action of the helix 19 of the feed screw 18 (FIG. 4).

Since the bottles are maintained in a vertical position in a predetermined path of travel by guide bars 23, 24, 25 (FIG. 3) it will be apparent that each bottle 2 is received in its corresponding flight of helix 19 and is urged forwardly by the leading edge of the helix as indicated schematically in FIG. 2.

From FIG. 2 it is also apparent that the resistance offered by flat bar 28 to forward movement of the bottles and the force imparted to the periphery of each bottle by helix 19 creates a couple acting about the longitudinal axes of each bottle tending to rotate the bottles in a clockwise direction as seen in FIG. 2.

When the bottles 2 are of the type which are provided with radially outwardly projecting spotting lugs 30 on the periphery thereof the feed screw 18 is positioned so that the spotting lug 30 engages the radially outwardly directed face of helix 19 thus stopping further rotation of the bottle. Thus, as indicated schematically in FIG. 2, bottles approaching the feed screw 18 are in random arrangement insofar as the angular position of spotting lugs 30 is concerned (see bottles 2a, 2b). However, under the influence of helix 19 and flat bar 28 the bottles are automatically rotated during their forward movement (see bottles 2c, 2d, 2e) until the spotting lugs 30 of the bottles engage the helix 19 at its horizontal diameter (see bottles 2f, 2g).

Obviously the feed screw 18 may be made of sufficient length to insure that all bottles are oriented to the angular position of bottles 2f and 2g before being removed from the influence of helix 19. As seen in FIG. 2 the spotted bottles 2k, 2m are pushed by the following bottles down the descending forward portion of flat bar 28 back onto conveyor 1 on which they may be carried to the labelling machine or through whatever subsequent operation is desired.

It will be apparent that the above described method and apparatus lends itself to use on bottles having other types of spotting devices such as recessed shoulders on the bottle peripheries and downwardly opening slots on the bottoms of the bottles.

FIG. 6 illustrates a bottle 6 provided with a downwardly opening slot 33 which is adapted to receive therein a flat bar 34 which is in all respects similar to flat bar 28 hereinbefore described. It will be apparent from FIG. 7 that when slot 33 is angularly disposed relative to the flat bar 28 the bottom of bottle 6 will be supported by flat bar 34 in exactly the same manner as bottles 2, previously described, were supported on flat bar 28. However, as bottle 6 is rotated by helix 19 flat bar 34 enters slot 33 and permits said bottle to fall downwardly onto conveyor 1 on which it is carried past feed screw 18 as described above. The coaction between slot 33 and flat bar 34 of course maintains all bottles in the same angular relationship until the bottles leave flat bar 34.

Another modification of bottle is shown in FIG. 8 wherein the sidewall of the bottle 35 is provided with a pair of recesses 36, 37 defining a ridge 38 therebetween. It will be apparent that the depth and extent of recesses 36, 37 may be formed so that helix 19 may enter recess 36 and engage ridge 38 as shown in FIG. 9. This action results in all bottles being stopped in somewhat the same manner as the helix stops bottles 2 in the structure shown in FIG. 2.

In connection with the structure shown in FIG. 9 it will be understood from a consideration of FIG. 2 that the bottles are, at all times, resisting froward movement. For this reason, when helix 19 comes alongside the leading recess 36 the bottle automatically tends to stop and move rearwardly slightly relative to the helix. This action permits the helix to work into the recess 36 until the shoulder defined by ridge 38 is engaged as shown in FIG. 9.

From the above description it will be apparent that an extremely effective spotting device is provided which is usable in bottles having various kinds of spotting elements. Furthermore, the apparatus is considerably more simple than the apparatus heretofore employed for the same purpose since the feed screw performs the dual function of advancing the articles and at the same time rotating them until they achieve the desired angular position.

The above very specific description of the invention should not be taken as restrictive thereof as it is obvious that various modifications in design may be resorted to without departing from the spirit of the invention as defined in the following claims.

We claim:

1. In an article spotting device for orienting cylindrical articles disposed with their axes vertical: an elongated horizontally extending feed screw provided with a helix adapted to engage the sidewall of an article for urging the latter in one direction along a path of travel parallel to the longitudinal axes of said feed screw, means for rotating said feed screw for so urging said article in said one direction, means for supporting such articles in a generally vertical position and for holding them in engagement with said screw at all points along said path so that each of said articles is received within a flight of said helix, said supporting means including an elongated fixed rail parallel to said path of travel and in supporting engagement with the bottoms of said articles at points offset from the centers thereof, said rail constituting the only support of said bottoms during a portion of the travel of said articles to provide a frictional drag on said bottoms whereby said helix urges said articles to rotate in one direction about their axes during said movement along said path.

2. In an article spotting device for orienting cylindrical articles disposed with their axes vertical: an elongated horizontally extending feed screw provided with a helix adapted to engage the sidewall of an article for urging the latter in one direction along a path of travel parallel to the longitudinal axes of said feed screw, means for rotating said feed screw for so urging said article in said one direction, means for supporting such articles in a generally vertical position and for holding them in engagement with said screw at all points along said path so that each of said articles is received within a flight of said helix, whereby said helix urges said articles to rotate in one direction about their axes during said movement along said path, and a stop element formed on each of said articles adapted to cooperate with a second stop for holding each of said articles against rotation when they are oriented in a predetermined angular position relative to said path, said stop element being an outwardly projecting projection on the sidewall of said article and said screw being positioned relative to said projection whereby the helix of said screw engages said stop element and thereby acts as said second stop.

3. In an article spotting device for orienting cylindrical articles arranged with their axes vertical, a conveyor having an upwardly directed surface for supporting the bottoms of said articles thereon for movement of said articles along a path of travel in one direction with said conveyor, a feed screw alongside said conveyor and provided with a helix adapted to engage the sidewall of said articles at a point above said conveyor and rotating in a direction to urge said articles in said one direction, means for so rotating said screw, means for limiting lateral movement of said articles in a direction away from said feed screw to hold each article on said conveyor within a flight of said screw during said movement, stationary means at a point along said path of travel for supporting said bottoms upwardly from said surface whereby said helix urges said articles along said path and simultaneously rotates said articles about their vertical axes.

4. In an article spotting device for orienting cylindrical articles arranged with their axes vertical, a conveyor having an upwardly directed surface for supporting the bottoms of said articles thereon for movement of said articles along a path of travel in one direction with said conveyor, a feed screw alongside said conveyor and provided with a helix adapted to engage the sidewall of said articles at a point above said conveyor and rotating in a direction to urge said articles in said one direction, means for so rotating said screw, means for limiting lateral movement of said articles in a direction away from said feed screw to hold each article on said conveyor within a flight of said screw during said movement, stationary means at a point along said path of travel for supporting said bottoms upwardly from said surface whereby said helix urges said articles along said path and simultaneously rotates said articles about their vertical axes, and means integral with said articles for stopping rotation of said articles at a predetermined angular relationship relative to said path of travel.

5. An article spotting device for cylindrical articles comprising: an elongated horizontally extending support adapted to support a row of such articles for movement along a horizontal path of travel, an elongated feed screw positioned alongside said path and above said support and provided with a helix adapted to engage the sidewalls of said articles for urging the latter along said path in one direction upon rotation of said screw in a corresponding direction, means for so rotating said screw, means for holding said articles in a predetermined position laterally of said path for urging said articles into engagement with said screw whereby one article is received within one flight of said screw and whereby said articles are rotated in one direction about their vertical axes by said screw, a radially outwardly projecting lug on each of said articles adapted to engage the radially outwardly directed face of said helix for stopping rotation of said articles when they are in a predetermined relationship relative to said path.

6. An article spotting device for cylindrical articles comprising: an elongated horizontally extending support adapted to support a row of such articles for movement along a horizontal path of travel, an elongated feed screw positioned alongside said path and above said support and provided with a helix adapted to engage the sidewalls of said articles for urging the latter along said path in one direction upon rotation of said screw in a corresponding direction, means for so rotating said screw, means for holding said articles in a predetermined position laterally of said path for urging said articles into engagement with said screw whereby one article is received within one flight of said screw and whereby said articles are rotated in one direction about their vertical axes by said screw, said horizontally extending support comprising a stationary bar having a relatively small thickness compared to the diameter of said bottle, the bottom of each of said articles being formed with a recess adapted to receive said bar therein for stopping rotation of said articles when they are in a predetermined angular relationship relative to said path.

7. In a bottle spotting device for orienting cylindrical articles disposed with their axes vertical: an elongated horizontally extending feed screw provided with a helix adapted to engage the sidewall of an article for urging the latter in one direction along a path of travel parallel to the longitudinal axes of said feed screw, means for rotating said feed screw for so urging said article in said one direction, means for supporting such articles in a generally vertical position and for holding them in engagement with said screw at all points along said path so that each of said articles is received within a flight of said helix, whereby said helix urges said articles to rotate in one direction about their axes during said movement along said path, and a stop element formed on each of said articles adapted to cooperate with a second stop for holding each of said articles against rotation when it is oriented in a predetermined angular position relative to said path, said supporting means including a relatively thin elongated and stationary bar disposed along said path and engaging the bottoms of said articles, said bar being disposed on the opposite side of the central axis of said articles from the side engaged by said helix to facilitate said rotation.

References Cited in the file of this patent

UNITED STATES PATENTS

| | | |
|---|---|---|
| 2,159,318 | Carter | May 23, 1939 |
| 2,543,142 | Wehmiller | Feb. 27, 1951 |
| 2,706,031 | Capstack | Apr. 12, 1955 |